(12) United States Patent
Kazawa et al.

(10) Patent No.: US 7,680,414 B2
(45) Date of Patent: Mar. 16, 2010

(54) PASSIVE OPTICAL NETWORK SYSTEM AND OPERATING METHOD THEREOF

(75) Inventors: Tohru Kazawa, Kokubunji (JP); Masaki Ohira, Yokohama (JP); Yusuke Yajima, Fujisawa (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 463 days.

(21) Appl. No.: 11/806,130

(22) Filed: May 30, 2007

(65) Prior Publication Data

US 2008/0187312 A1 Aug. 7, 2008

(30) Foreign Application Priority Data

Feb. 2, 2007 (JP) ............................. 2007-023652

(51) Int. Cl.
*H04J 14/00* (2006.01)
(52) U.S. Cl. .............................. 398/67; 398/68; 398/70; 398/71; 398/72
(58) Field of Classification Search ................... 398/58, 398/63, 64, 66–72
See application file for complete search history.

(56) References Cited

U.S. PATENT DOCUMENTS

| | | | |
|---|---|---|---|
| 6,115,163 | A | 9/2000 | Nobuhara |
| 7,164,682 | B2 | 1/2007 | Iwamura et al. |
| 7,212,540 | B2* | 5/2007 | Unitt et al. .................. 370/452 |
| 2002/0063932 | A1* | 5/2002 | Unitt et al. .................. 359/168 |
| 2004/0101302 | A1* | 5/2004 | Kim et al. .................... 398/45 |
| 2004/0202174 | A1* | 10/2004 | Kim et al. ................. 370/395.1 |
| 2008/0267628 | A1* | 10/2008 | Li et al. ....................... 398/79 |

FOREIGN PATENT DOCUMENTS

| | | |
|---|---|---|
| JP | 04-035330 | 2/1992 |
| JP | 11-112439 | 4/1999 |
| JP | 2001-292148 | 10/2001 |

(Continued)

OTHER PUBLICATIONS

"Draft amendment to Carrier Sense Multiple Access with Collision Detection (CSMA/CD) access method and physical layer specificatons", IEEE Draft p802.3ah™/D3.3, 2004, pp. 1-692, Institute of Electrical and Electronics Engineers, Inc., New York, USA.

(Continued)

*Primary Examiner*—Dalzid Singh
(74) *Attorney, Agent, or Firm*—McDermott Will & Emery LLP

(57) ABSTRACT

A Passive Optical Network system implementing a parent station capable of receiving high-speed burst signals transmitted from a plurality of subsidiary stations to a parent station, with excellent bandwidth utilization efficiency in the link from the stations to the parent. The system is provided with a configuration in which, when launched or an addition of a new subsidiary station, the parent stores threshold values appropriate for the received signals on the basis of the strength of the received signal for each subsidiary station, from among a plurality of preset threshold value candidates, and in response to the parent station's sending of a transmission grant with respect to each subsidiary station each time the subsidiary station transmitting optical signals changes, the stored threshold value corresponding to the subsidiary station is set in the receiver circuit.

1 Claim, 15 Drawing Sheets

FOREIGN PATENT DOCUMENTS

| | | |
|---|---|---|
| JP | 2002-057627 | 2/2002 |
| JP | 3567867 | 6/2004 |
| JP | 2005-039309 | 2/2005 |
| JP | 2005-045560 | 2/2005 |
| JP | 2005-130131 | 5/2005 |
| JP | 2007-019797 | 1/2007 |

OTHER PUBLICATIONS

ITU-T, "Series G: Transmission Systems and Media Digital Systems and Networks, Digital sections and digital line system—Optical line systems for local and access networks, Gigabit-capable Passive Optical Networks (GPON): General characteristics", ITU-T Recommendation G.984.1, Mar. 2003, pp. 1-14, International Telecommunicaton Union.

ITU-T, "Series G: Transmission Systems and Media Digital Systems and Networks, Digital sections and digital line system—Optical line systems for local and access networks, Gigabit-capable Passive Optical Networks (GPON): Physical Media Dependent (PMD) layer specification", ITU-T Recommendation G.984.2, Mar. 2003, pp. 1-29, International Telecommunication Union.

ITU-T, "Series G: Transmission Systems and Media Digital Systems and Networks, Digital sections and digital line system—Optical line systems for local and access networks, Gigabit-capable Passive Optical Networks (G-PON): Transmission convergence layer specification", ITU-T Recommendation G.984.3, Mar. 2003, pp. 1-107, International Telecommunication Union.

Japanese Notice of Reasons for Rejection, with English Translation, issued in Japanese Patent Application No. JP 2007-023652, mailed Dec. 16, 2008.

* cited by examiner

FROM HERE ON, NORMAL OPERATION (COMMUNICATION)
IS CONDUCTED BY CARRYING OUT DBA

FIG.12

| OPERATION NUMBER (24300) | TIME IN RANGING WINDOW (24301) | THRESHOLD VALUE (24302) |
|---|---|---|
| 1ST TO 3RD OPERATIONS | 0 ~ 12.5 μs | V21 |
|  | 12.5 ~ 25 μs | V20 |
|  | 25 ~ 37.5 μs | V19 |
|  | . . . | . . . |
|  | 247.5 ~ 250 μs | V2 |
| 4TH TO 6TH OPERATIONS | 0 ~ 12.5 μs | V20 |
|  | 12.5 ~ 25 μs | V19 |
|  | 25 ~ 37.5 μs | V18 |
|  | . . . | . . . |
|  | 247.5 ~ 250 μs | V1 |
| . . . | | |
| 61ST TO 63RD OPERATIONS | 0 ~ 12.5 μs | V1 |
|  | 12.5 ~ 25 μs | V1 |
|  | 25 ~ 37.5 μs | V1 |
|  | . . . | . . . |
|  | 247.5 ~ 250 μs | V1 |

| ONU ID | RECEIVER THRESHOLD VALUE |
|---|---|
| 1 | V17 |
| 2 | V1 |
| 3 | V5 |
| . . . | . . . |
| N | NOT MEASURED YET |

PASSIVE OPTICAL NETWORK SYSTEM AND OPERATING METHOD THEREOF

INCORPORATION BY REFERENCE

The present application claims priority from Japanese application JP 2007-023652 filed on Feb. 2, 2007, the content of which is hereby incorporated by reference into this application.

BACKGROUND OF THE INVENTION

The present invention pertains to a configuration as well as an operating method of a Passive Optical Network system in which a plurality of subscriber connection devices share a transmission line.

In order to transmit and receive high-capacity image signals or data via a communication network, the attainment of higher speeds and larger bandwidths is being advanced as well in the access network connecting the subscriber to the communication network, the introduction of a Passive Optical Network system (below called "PON") defined in Recommendation G984.1-3 et cetera of the International Telecommunications Union (below called "ITU-T") being aimed for. A PON is a system connecting an Optical Line Termination (below called "OLT") connected to a host communication network; and Optical Network Units (below called "ONU") accommodating a plurality of subscriber terminals (PCs or telephones) connected with a passive optical network consisting of a trunk optical fiber and branch optical fibers. Specifically, it is a system carrying out communication with a mode in which the signals coming from the terminals (PCs and the like) connected to each ONU are sent as optical signals from branch optical fibers via an optical splitter and optically multiplexed (by time division) with the trunk optical fiber to the OLT and the OLT carries out communication processing of the signals from each ONU and either transmits them to the host communication network or transmits them to another ONU connected to the OLT.

Each ONU can, e.g. as defined in Chs. 8 and 9 of Recommendation G984.1, have the combined fiber length (transmission distance) of the trunk optical fiber and the branch optical fiber from the OLT set arbitrarily within 0-20 km, 20-40 km, and 40-60 km ranges. That is to say that since there is a random variation in the transmission delay between each ONU and the OLT, there is a possibility, even if each ONU transmits a signal, that the optical signals output from each ONU on the trunk optical fiber collide and interfere with each other. For this reason, by using e.g. ranging technology defined in Ch. 10 of Recommendation G984.3, the delay in the output signal of each ONU is regulated, after carrying out a distance measurement between the OLT and the ONU, as if each ONU had been set to an equal distance (e.g. 20 km) from the OLT. Then, when the OLT decides, for each ONU, on the signal bandwidth in which transmission is granted, it assigns transmission timing to each ONU so that the optical signals from each ONU on the trunk optical fiber do not collide or interfere, assuming that the distance to each OLT is an equal distance. Further, at the head of the signal from each ONU, if what is concerned is e.g. that specified in Section 8.3.3 of Recommendation G.984.2, there are added a guard time for interference prevention consisting of at most 12 bytes, a preamble utilized for the determination of a signal discrimination threshold value of the internal OLT receiver and clock extraction, and a delimiter discriminating breaks in the received signals so as to make it possible to discriminate and process the signals from each ONU multiplexed by the OLT on the trunk optical fiber.

However, as mentioned above, even if collisions between the optical signals are avoided, the received levels of the optical signals at the OLT from each ONU differ greatly since the actual lengths of the optical fibers differ. For this reason, it is a configuration in which the preamble of the optical signal is used, the received level of the optical signal is measured, the signal from each ONU is received after adjusting the signal discrimination threshold value and the clock phase of the receiver inside the OLT to correspond to the concerned ONU each time a signal from each ONU is received at the OLT. Further, as disclosed in JP-A-2002-57627, it is possible, instead of adjusting the signal discrimination threshold value, to choose a configuration in which the signal, after measurement of the received signal level, is received after amplifying the received signal to a prescribed level using an optical amplifier.

The development and introduction of the PON started from handling signals with low speeds such as 64 kbit/s and is now proceeding with the introduction of the higher-speed BPON (Broadband PON) and GPON (Gigabit PON) handling signals on the order of 2.4 Gbit/s. Moreover, in the future, there is demanded the implementation of high-speed PONs capable of handling signals from 10 Gbit/s to 40 Gbit/s. Also, these PONs have gradually come from handling conventional fixed-length signals to burst-shaped variable-length signals (burst signals).

As mentioned above, since the received levels of the optical signals differ greatly, it is demanded of the OLT burst signal receiver circuit receiving multiplexed optical signals from each ONU both a large dynamic range capable of handling this random variation and a high-speed tracking ability devised to be able to accurately receive optical signals from each ONU in a short time. However, if e.g. the transmission speed of the optical signals is 1.2 Gbit/s, in order to attain a high-speed tracking ability performing signal discrimination threshold value determination of received signals and clock adjustment in a short time in the OLT receiver circuit, it is demanded to implement a receiver circuit using high-speed devices operating at speeds (on the order of 4 Gbit/s to 10 Gbit/s) at least several times higher than the optical signal transmission speed. This trend will be the same for further speed increases in the future. An economical supply of receiver circuits using devices able to handle these kinds of high transmission speeds is not straightforward. Of course, if a configuration is adopted in which, without speeding up the receiver circuit, the preamble preceding the burst signal is made longer and the signals from each ONU are tracked slowly, the tracking ability performance demanded of the receiver circuit is relaxed. However, if the preamble is made longer, the net bandwidth that can be used for the transmission of the signals from each ONU decreases and the bandwidth utilization efficiency drops. That is to say that it ends up going against the objective of speeding up the system. Also, in a configuration in which an amplifier such as in JP-A-2002-57627 is introduced, the configuration of the receiver circuit becomes a little easier, but there is no change in the need for receiver level measurements of the received optical signals, and since the configuration ends up becoming one using a costly amplifier using active components, it becomes difficult to attain the goal of making PONs economical.

SUMMARY OF THE INVENTION

The present invention has for an object to furnish a PON provided with a configuration resolving the aforementioned problems. That is to say that it has for an object to furnish a PON with excellent bandwidth utilization efficiency which is capable of receiving high-speed burst signals with an economical configuration and which can increase signals that can be transmitted from each ONU by eliminating or shortening the preambles from each ONU.

The aforementioned problem is resolved by providing a configuration in which, when a new ONU is added at the time of the launch of the PON system or during operation, the OLT selects and stores, on the basis of the magnitude of the received signal from each ONU, an appropriate threshold value for the discrimination of received signals from among plural preset threshold candidates and during PON operation, sets a threshold value corresponding to the stored concerned ONU each time the ONU transmitting optical signals changes in response to the OLT's emitting a signal transmission grant with respect to each ONU.

As for the threshold value selection from among plural preset threshold candidates, there has been adopted a configuration in which, in the ranging (distance compensation) process conducted before the ONU enters into normal operation, threshold value candidates enabling the receiver of signals with the receiver are supplied to the receiver circuit in a sequence based on a prescribed rule, ranging is carried out, and the threshold value for which ranging has been successful is stored as the threshold value corresponding to the concerned ONU.

Further, since the level of the received optical signal becomes shorter because the loss in an optical fiber is greater for a signal coming from an ONU at a longer distance and it is received after a delay time proportional to the distance between the OLT and the ONU, it is acceptable to adopt a configuration in which, in the ranging process, optical signals from ONUs are expected with a large threshold value at the beginning of the ranging and optical signals are awaited by switching to a small threshold value in response to the lapse of time. According to this configuration, even if the plural preset threshold values are not tested without exception, it becomes possible to search appropriate threshold values in a short time from among the threshold value candidates for which the probability that the ranging succeeds is higher, so it becomes possible to shorten the activation time of the PON and the ONU.

According to the present invention, it is possible to provide a PON with excellent bandwidth utilization efficiency which can receive high-speed burst signals with an economical configuration and which can increase the signals which can be received from each ONU.

BRIEF DESCRIPTION OF THE DRAWINGS

FIG. 12 is a memory block diagram showing a configuration example of a threshold value table during ranging provided in a threshold value storage part.

FIG. 14 is a memory block diagram showing a configuration example of a threshold value table during operation in a threshold value management part.

DESCRIPTION OF THE EMBODIMENTS

Below, a detailed description will be given, using the drawings, of a PON configuration and operation according to the present invention, citing as an example the operation of the configuration of a GPON defined in ITU-T Recommendation G984.

Figure 1:
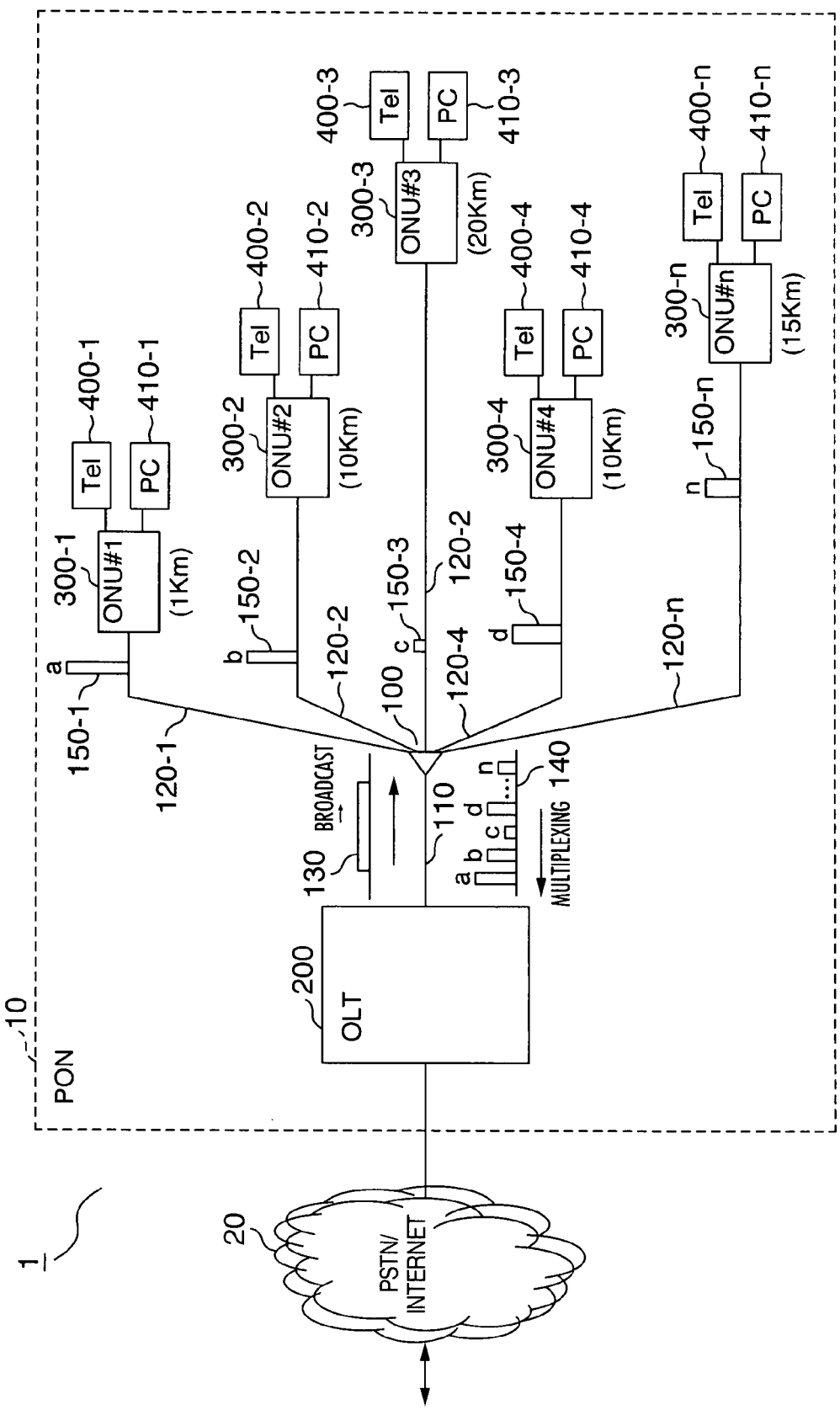
FIG. 1 is a network block diagram showing a configuration example of an optical access network using a PON.
Figure 2:
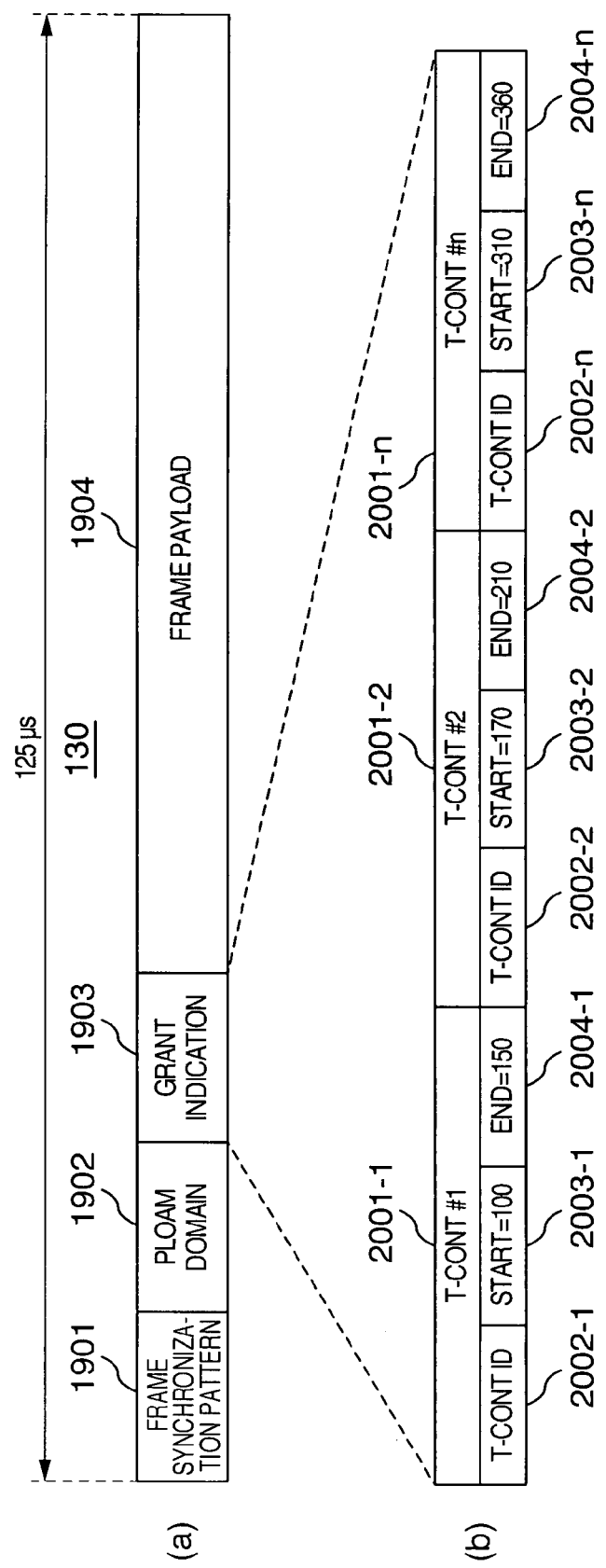
FIG. 2 is a frame block diagram showing a configuration example of an optical signal from an OLT to an ONU.
Figure 3:
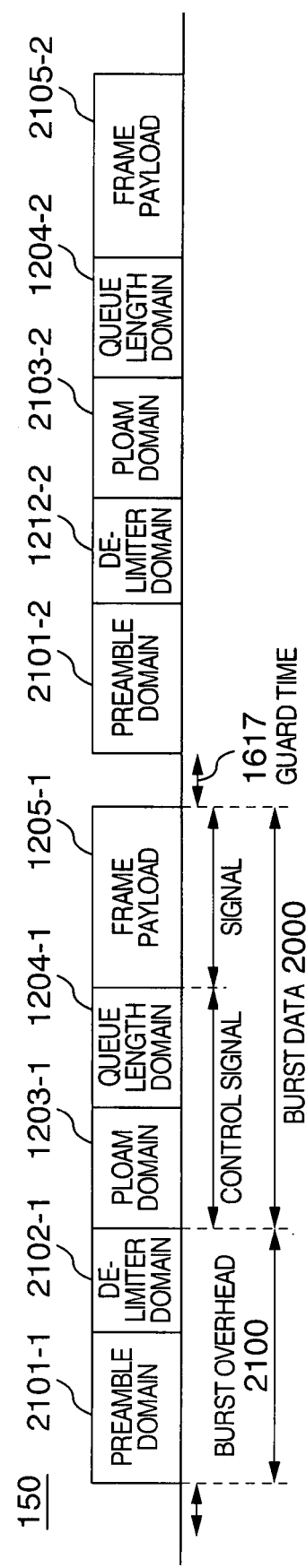
FIG. 3 is a frame block diagram showing a configuration example of an optical signal from the ONU to an OLT.
Figure 4:
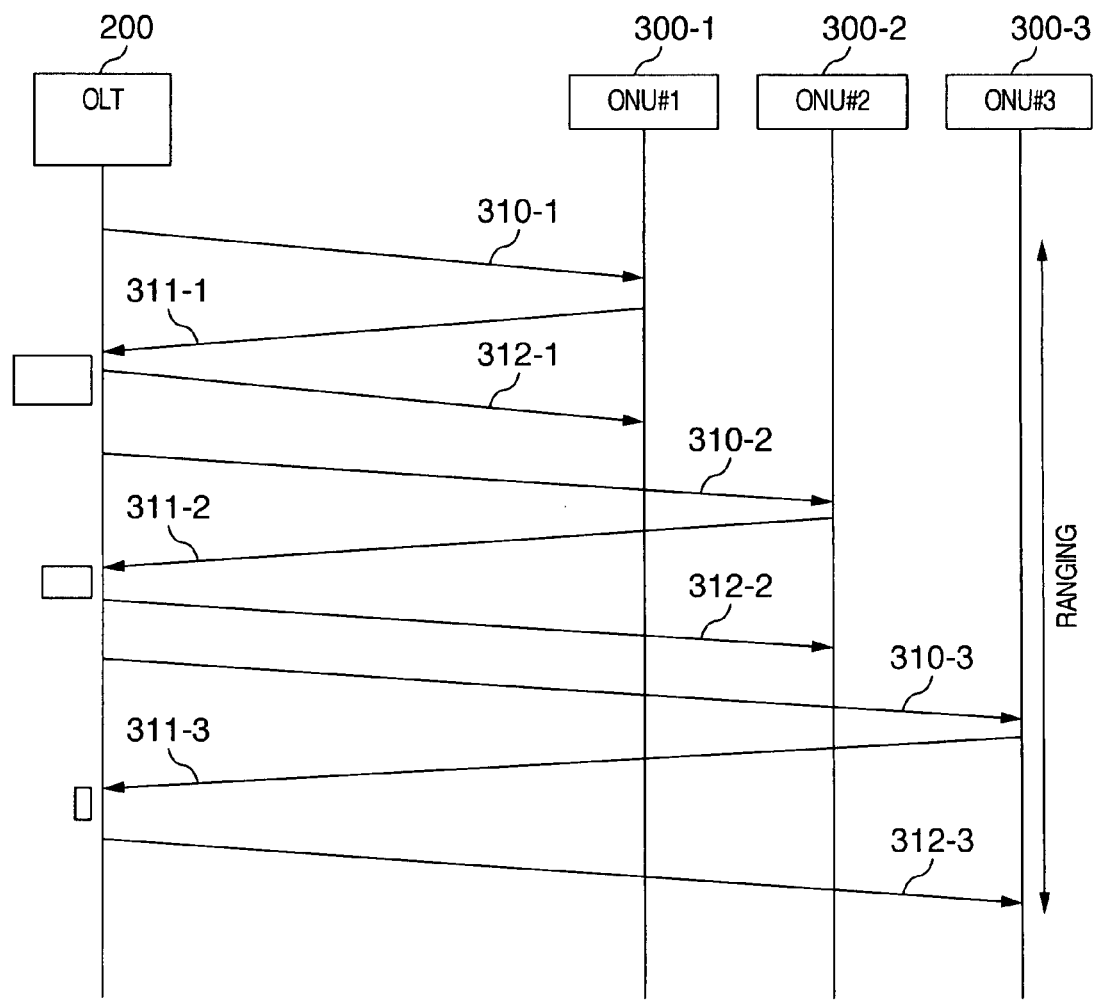
FIG. 4 is a sequence diagram showing an example of an operating sequence of a PON.
Figure 5:
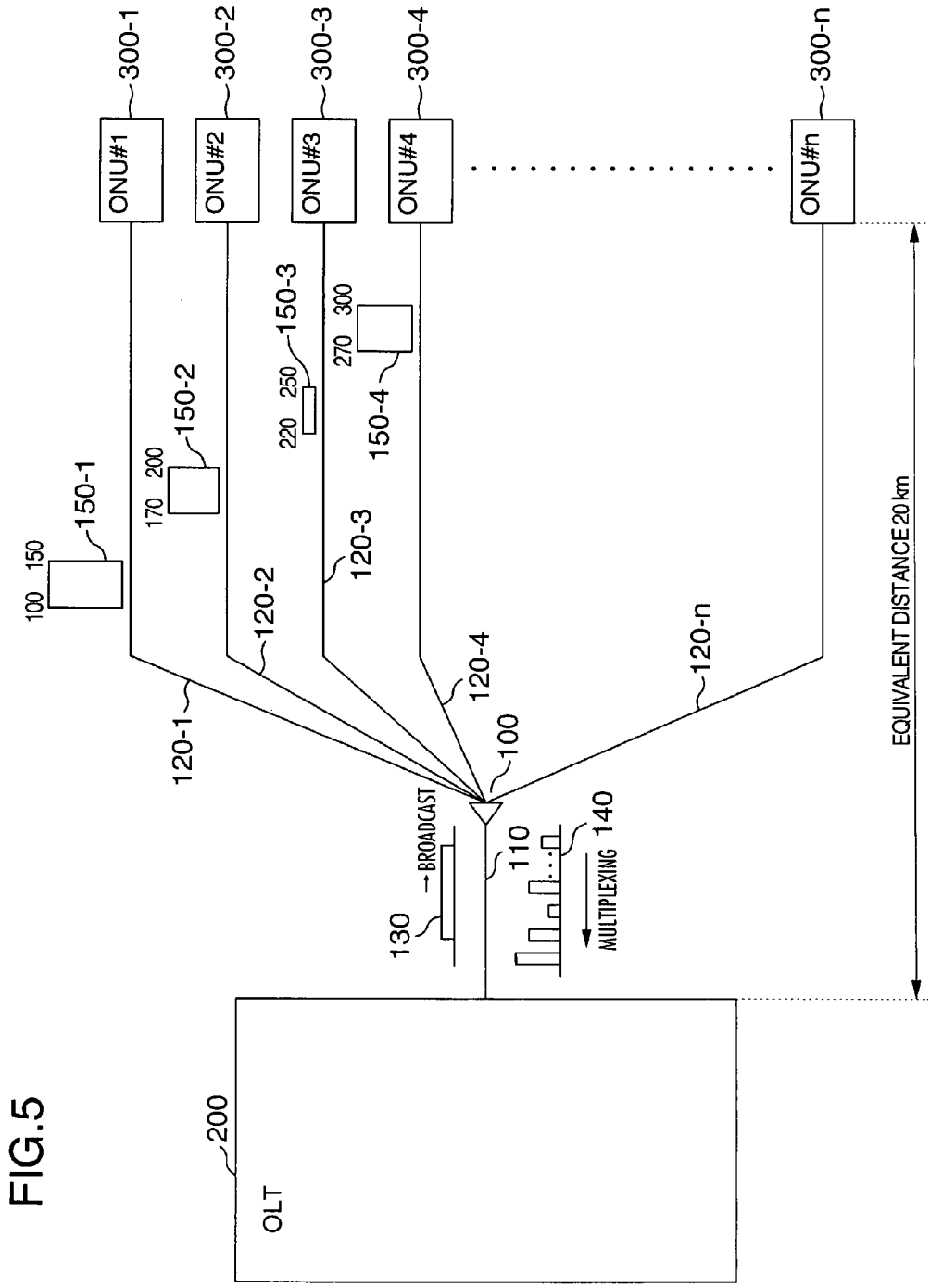
FIG. 5 is an explanatory diagram showing a first working example of a PON.

FIG. 1 is a network block diagram showing a configuration example of an optical access network using a PON. FIG. 2 and FIG. 3 are frame block diagrams respectively showing the configuration of an optical signal from an OLT to an ONU and an optical signal from an ONU to an OLT. Also, FIG. 4 is a sequence diagram showing an example of an operating sequence of a PON and FIG. 5 is an explanatory diagram showing a working example of a PON.

As shown in FIG. 1, an access network 1 is a network carrying out communication by connecting a public Switched Telephone network (PSTN)/Internet 20 (below sometimes called "host network") and subscriber terminals (such as Tel 400 and PC 410) through a PON 10. PON 10 comprises an OLT 200 (below sometimes called a "parent station") connected to host network 20 and a plurality of ONUs 300 (below sometimes called "subsidiary stations") accommodating subscriber terminals (such as telephone 400 (Tel) and PC 410) and is a network that connects OLT 200 and each ONU 300 by means of a passive optical network consisting of a trunk optical fiber 110, an optical splitter 100, and a plurality of branch optical fibers 120 to carry out communication between host network 20 and subscriber terminals 400 and 410 or communication between subscriber terminals 400 and 410. As for ONUs 300, a maximum of 64 units can be connected to OLT 200, following Recommendation G984. In FIG. 1, five ONUs 300 are illustrated, showing a situation in which the optical fiber lengths from OLT 200 respectively differ. In the same figure, there is shown an example in which ONU 300-1 is installed at a distance with an optical fiber length of 1 km from OLT 200, ONU 300-2 with an optical fiber length of 10 km from OLT 200, ONU 300-3 with an optical fiber length of 20 km from OLT 200, ONU 300-4 with an optical fiber length of 10 km from OLT 200, and ONU 300-*n* with an optical fiber length of 15 km from OLT 200. The notation "(XX km)" in the figure indicates the fiber length between the OLT and the ONU.

The signal from OLT 200 to each ONU 300 is called a downlink signal 130 and is broadcast to each ONU and composed, as shown in Part A of FIG. 2, within a 125 μs frame, of a control signal consisting of a frame synchronization pattern 1901, a PLOAM domain 1902, and a grant indication domain (US Bandwidth MAP) 1903, as well as a frame payload 1904 in which the signals to each ONU 300 are time division multiplexed. Each ONU 300 judges whether the received signal from the control signal is a signal destined for it and does things like performing various operations, explained hereinafter, in response to the control signal and transmitting the signal to destination terminals 400 and 410.

Moreover, the signals from each ONU 300 to OLT 200 are called uplink signals 150 and, as shown in FIG. 3, are signals in which a burst overhead 2100 consisting of a preamble 2101, for discriminating and processing burst data from each ONU 300 by OLT 200, and a delimiter 2102 have been added to burst data 2000 consisting of a control signal, which consists of a PLOAM domain 1203 and a queue length domain 1204, and a variable-length frame payload 1205 in which the signals from the terminals 400 and 410 of the concerned ONU are entered. Further, a guard time 1617 shown before preamble 2101 is a non-signal domain (with the optical signal in the OFF state) for separating the transmitted signals from each ONU, the total of this guard time 1617 and burst data overhead 2100 being defined in Recommendation G984.3 to be at most 12 bytes. As shown in FIG. 1, an uplink signal 150-1 of ONU 300-1, an uplink signal 150-2 of ONU 300-2, an uplink signal 150-3 of ONU 300-3, an uplink signal 150-4 of ONU 300-4, and an uplink signal 150-*n* of ONU 300-*n* are time division multiplexed on trunk optical fiber 110 after having passed through optical splitter 100 to become a multiplexed optical signal 140 and reach OLT 200. Further, since the optical fiber lengths between ONUs 300 and OLT 200 differ, multiplexed optical signal 140, as illustrated, takes on a mode in which signals for which the levels of the optical signals from each ONU differ are time division multiplexed.

In PON 10, since the transmission distances between OLT 200 and each ONU 300 are different, an operation called ranging is executed at the time of the operation start and when an ONU is added so that the uplink signals 150 from each ONU 300 do not collide or interfere on trunk optical fiber 110. Specifically, as shown in FIG. 4, if a Ranging Request signal 310-1 is transmitted from OLT 200 to a certain ONU 300 (e.g. ONU No. 1, 300-1) using grant indication domain 1903, ONU 300-1 transmits a Ranging Response signal 311-1 to OLT 200 with a timing that is delayed by just a specified time after the receiver of the concerned Ranging Request signal 310-1. OLT 200, after determining the distance up to ONU 300-1 from the difference in the transmission timing of Ranging Request signal 310-1 and the receiver timing of Ranging Response signal 311-1, requests a delay quantity such that the concerned OLT 300-1 appears as if it is installed at a prescribed distance (e.g. 20 km) and reports this delay quantity with a Ranging Time Message 312-1 using PLOAM domain 1902. In ONU 300-1, this delay quantity is set within the device and provided in the operations (communication) thereafter. As shown in signals 310-2, 310-3, 312-3, and 312-3 of FIG. 4, if the same control is repeated in the other ONUs 300 as well, each ONU 300 looks like it is installed at the same transmission distance from OLT 200 as shown in FIG. 5, DBA or the like is performed, and normal operation is executed.

In PON 20 of the present invention, as will be subsequently described in detail, the threshold values with which the optical signals from each ONU 300 can be correctly received are selected from among the discrimination threshold value candidates, set in advance inside OLT 200, of the plurality of received signals, utilizing the Ranging Response signal 311, received from each ONU 300 and stored at the time of the aforementioned ranging, and in the subsequent PON 20 operation, the receiver circuit uses these stored threshold values when receiving the signals from each ONU 300 to receive the optical signals surely and carry out communication.

Specifically, when ranging has come to an end and the communication (transmission and receiver of signals) between OLT 200 and ONU 300 is started, OLT 200 carries out Dynamic Bandwidth Assignment (below called "DBA") which decides on the signal quantity (bandwidth) granted for transmission to each ONU 300 on the basis of control parameters decided by requests, advance contracts, or the like from each ONU 300. Specifically, it indicates, by means of control signal 2001 shown in Part B of FIG. 2, the timing granted for signal transmission to each ONU 300 in byte units, using grant indication domain 1903. In the same drawing, a TCONT ID item 2002 shows the identifier of the object for which bandwidth is granted, a Start item 2003 shows the burst data transmission start timing of a control signal in which a part of PLOAM domain 1203 is excluded and the signal of frame payload 1205, and an End item 2004 shows the transmission end timing of burst data 2000. Here, TCONT means the units for which it is possible to execute bandwidth assignment inside ONU 300. In the ITU-T Recommendation, it is possible to set a plurality of TCONT items for ONU 300, the indication of uplink transmission grant timing being carried out for each TCONT item. Further, in the present embodiment, the explanation is carried out with a setting of having one TCONT item for each ONU 300.

FIG. 5 is a drawing showing a working example of a PON after DBA has been performed where, in order to use the uplink signal bandwidth efficiently, the uplink signals 150 from each ONU 300 do not mutually collide, are time division multiplexed without being greatly separated, and are received at OLT 200. In the example of Part B of FIG. 2, and FIG. 5, there is shown a situation in which uplink signal 150-1 from ONU No. 1 (300-1) has 50 bytes from 100 to 150, uplink signal 150-2 from ONU No. 2 (300-2) has 30 bytes from 170 to 200, uplink signal 150-3 from ONU No. 3 (300-3) has 30 bytes from 220 to 250 and further, uplink signal 150-4 from ONU No. 4 (300-4) has 30 bytes from 270 to 300 which are time division multiplexed on trunk optical fiber 110 in a state with the respective optical signal levels being different and received at OLT 200. Further, in the same drawing, there is shown, as each uplink signal 150, the transmission position of the burst data, with the bandwidth decided by means of the aforementioned DBA, and the previously explained burst overhead item 2100 and guard time are installed between these uplink signals 150 (before each uplink signal 150). The present invention shortens burst overhead items 2100 and the guard times to aim for efficient utilization of the uplink signal bandwidth by setting, between the guard times, the threshold values of the receiver circuit of OLT 200 to be the threshold values stored corresponding to the ONU to be optically received next, to correctly receive the optical signals and carry out communication.

Figure 6:
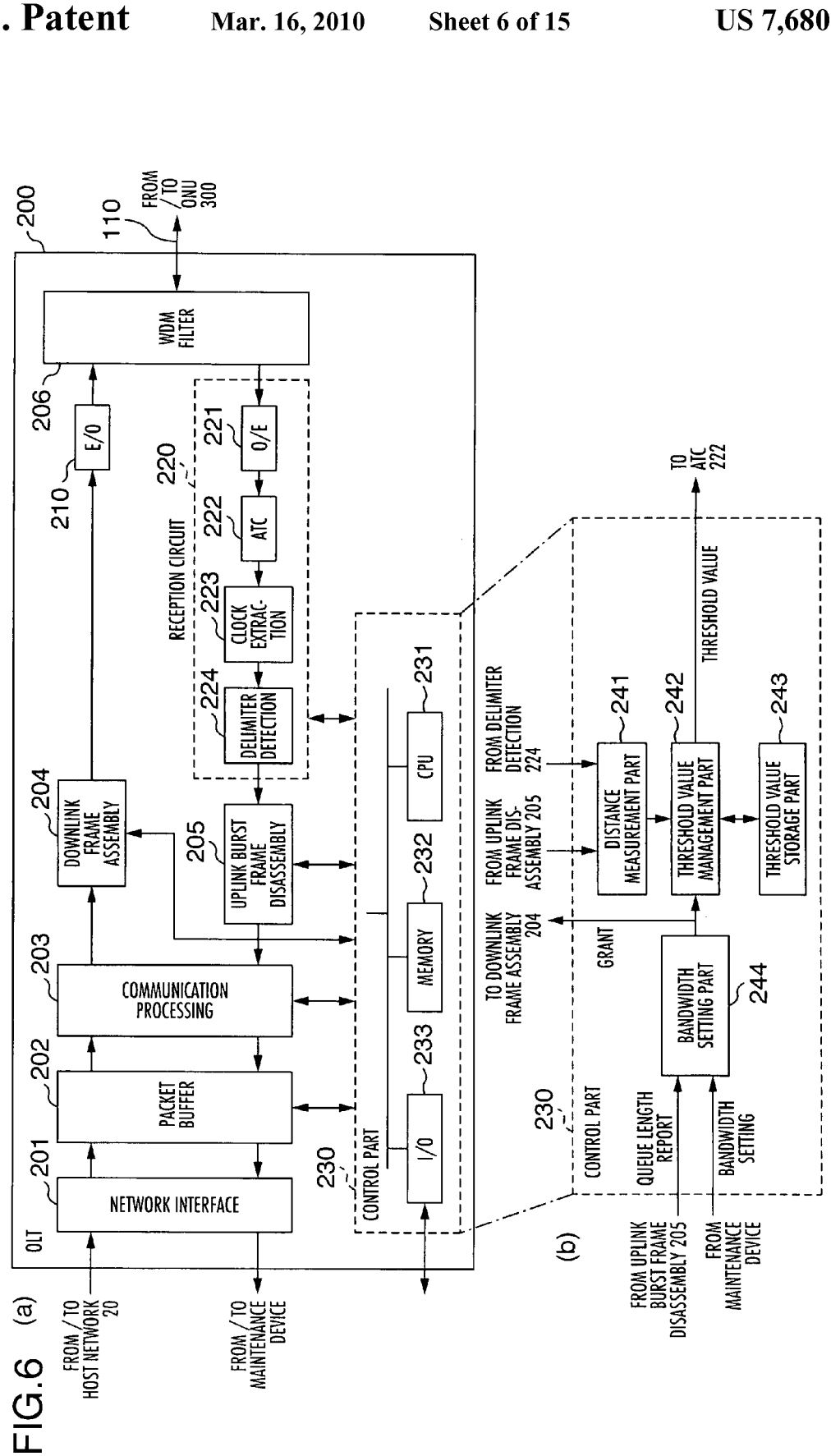
FIG. 6 is a block diagram showing a configuration example of an OLT.

Hereinafter, the configuration and operation of the OLT will be explained in further detail using the drawings. FIG. 6 is a block diagram showing a configuration example of the OLT.

OLT 200 consists, as shown in Part A of FIG. 6, of a network interface 201 which is an interface carrying out signal transmission and receiver to and from host network 20; a packet buffer 202 temporarily storing signals transmitted to and received from host network 20 and ONU 300; a communication management part 203 carrying out communication management (such as switching and signal conversion) on transmitted and received signals; a downlink frame assembly part 204 assembling downlink signal 130 shown in FIG. 2; an E/O part 210 converting electrical signals into optical signals; a WDM (Wavelength Division Multiplexing) filter 206 connected with trunk optical fiber 110 and carrying out transmission and receiver of optical signals to and from ONU 300 through a passive optical network; a receiver circuit 220 receiving optical signals from ONU 300 via WDM filter 206; an uplink frame disassembly part 205 separating control signals and signals from ONU terminals 400 and 410 or the like, from burst data 2000 of uplink signal 150 shown in FIG. 3; and a control part 230 controlling the OLT as a whole. Further, receiver circuit 220 consists of an O/E part 221 converting the received optical signals into electrical signals; a discrimination part 222 (below called an ATC (Automatic Threshold Control) part discriminating (by "0"/"1" judgment), using stored threshold values such as will be subsequently described, signals from electrical signals resulting from converting optical signal ON/OFF states with O/E part 221; a block extraction part 223 extracting blocks from received signals and carrying out phase adjustment; and a delimiter detection part 224 detecting delimiters (reference 2102 in FIG. 3) indicating the previously explained signal breaks; and is a circuit that outputs burst data 2000 with burst overhead 2100 removed from uplink signal 150 from each ONU 300. Also, control part 230 consists of a memory 232 storing various control data and control programs implementing various functions; a CPU 231 executing these control programs and executing the control of the whole OLT 200; and an I/O unit 233 transmitting and receiving data used for the maintenance and operation of an external maintenance device (not illustrated) and PON 20; and as will subsequently be described in detail and is shown in Part B of FIG. 6, it forms functional blocks carrying out various control functions such as a distance measurement part 241 carrying out ranging; a threshold value management part 242 and a threshold value storage part 243 managing threshold values that are set in ATC part 222 of receiver circuit 220 for discriminating received optical signals from ONU 300; and a bandwidth setting part 244 carrying out DBA.

OLT 200 with the aforementioned configuration operates as described hereinafter.

1. At the time of PON system launch or installation of a new ONU 300, OLT 200 carries out ranging using distance measurement part 241. Further, distance measurement part 241 is a part that carries out, a detailed explanation thereof being omitted, signal transmission/receiver and operation, such as previously explained using FIG. 4, by means of programs provided by CPU 231 and memory 232 provided in control part 230. OLT 200 is devised so that, in the ranging process conducted by distance measurement part 241, it operates together with threshold value management part 242 by setting, from among a plurality of received signal discrimination threshold value candidates preset in threshold value storage part 243, the threshold values in ATC 222 with a prescribed sequence and timing while switching them, and can properly receive the Ranging Response (Ref. 311 in FIG. 4) from the ONU 300 being the object of the ranging (below sometimes called "ranging success"), and stores the threshold value at the time of this ranging success in threshold value storage part 243 as the received signal threshold value of the concerned ONU.

2. When the ranging in distance measurement part 241 comes to an end, bandwidth setting part 244 of OLT 200 carries out DBA, taking into account the quantity of signals stored in queue length domain (Ref. 1204 in FIG. 3) received from each ONU 300 and whose receiver is expected by the ONU, and traffic conditions set based on advance contracts and the like (e.g. the lowest guaranteed bandwidth or the highest bandwidth for the concerned ONU or for each TCONT), and reports the signal (burst data 2000) transmission timing to each ONU with a grant indication domain (Part B of FIG. 2). Since each ONU 300 transmits uplink signal 150 with the timing indicated in OLT 200, multiplexed optical signal 140, in which uplink signals 150 from each ONU 300 are time division multiplexed, is input to receiver circuit 220 or OLT 200 (refer to FIG. 5).

3. Since OLT 200 stores, in the aforementioned DBA operating sequence, which uplink signal 150 can be received from which ONU 300 at which timing, bandwidth setting part 243 and threshold value management part 242, operating together, set the threshold value of the received signal of the concerned ONU 300 stored in threshold value storage part 243 as the result of the ranging in ATC 222 in the interval of the guard time before receiving an uplink signal 150 from an arbitrary ONU 300, and receive the concerned uplink signal 150. This process is conducted each time the transmission source ONU 300, of the uplink signals 150 time division multiplexed into multiplexed optical signal 140, changes.

If the configuration and operation such as described above are carried out, optical signals from ONU 300 can be received even if high-speed (costly) devices are not used in the receiver circuit. Also, even if preamble domain 2101 and delimiter domain 2102, which are added before burst data 2000 such as previously explained, are made shorter (or eliminated), efficient bandwidth utilization becomes possible, since burst data 2000 can be received correctly by assigning the bytes corresponding to this shortened portion to frame payload 1205, into which the signal from ONU 300 is entered.

Figure 7:
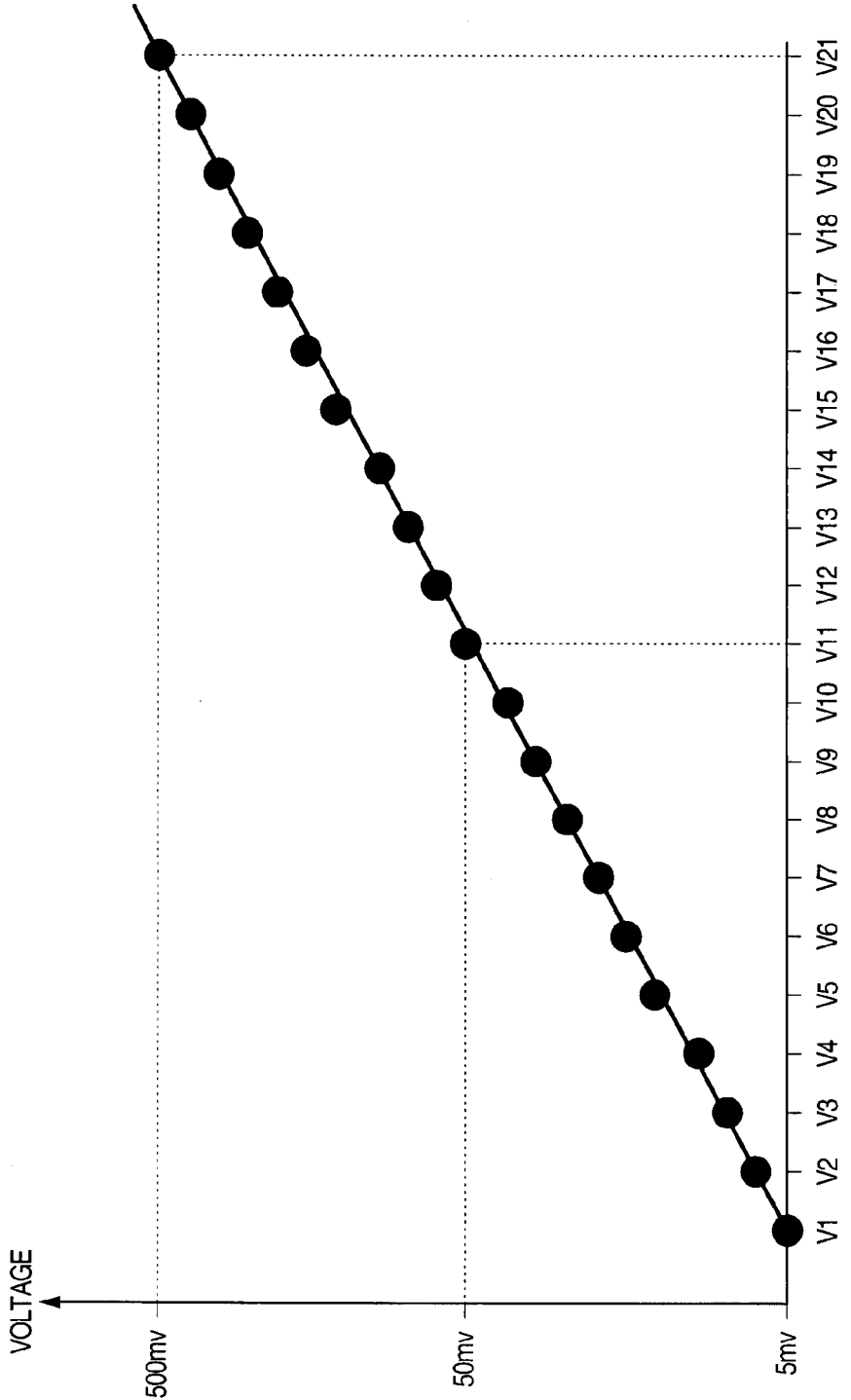
FIG. 7 is an explanatory diagram showing an example of threshold value candidates set in a threshold value storing part provided in an OLT.

Here, an explanation will be given of a setting example of a threshold value discriminating a received signal. FIG. 7 is an explanatory diagram showing an example of threshold value candidates set in threshold value storage part 243.

An optimal threshold value discriminating a received signal means the mid-point between a "1" level voltage and a "0" level voltage, so if the "0" level voltage is considered to be 0 V, the optimal threshold value is half the value of the "1" level voltage. Here, the dynamic range within which the received signal level at OLT 200 can fluctuate is e.g. estimated to be 15 dB for the random variation in the loss of the optical fiber and the optical splitter and 5 dB for the random variation of the transmission power of the ONU, in total 20 dB. Since this 20 dB dynamic range corresponds to a hundredfold amplitude difference, if O/E part 221 is configured so as to convert a received signal inside the receiver into voltages from 10 mV to 1000 mV, the threshold value set in ATC 222 must be changed in the interval from 5 mV to 500 mV. Since a setting error between the threshold value set in ATC 222 and an ideal value is more tolerated the greater amplitude the signal has, it is reasonable, rather than setting a plurality of threshold value candidates prepared in advance with a linear scale, to set them with an exponential function scale such as shown in FIG. 7. In the present embodiment, threshold value V1 is taken to be 5 mV, threshold value V11 50 mV, and threshold value V21 500 mV, the voltages therebetween being complemented with an exponential function to adopt a structure in which 21 threshold values V1 to V21 are set as candidates in threshold value storage part 243 in advance. Further, the aforementioned explanation is an example in which the dynamic range fluctuates as a function of the characteristics (the loss) of optical fibers 110 and 120 and optical splitter 100 and the conversion characteristics of O/E part 221 and since the number of prepared threshold value candidates and the exponential relationship of each candidate value are factors that can change depending on the error rate tolerated in the PON, they are not limited to the present embodiment.

Figure 8:
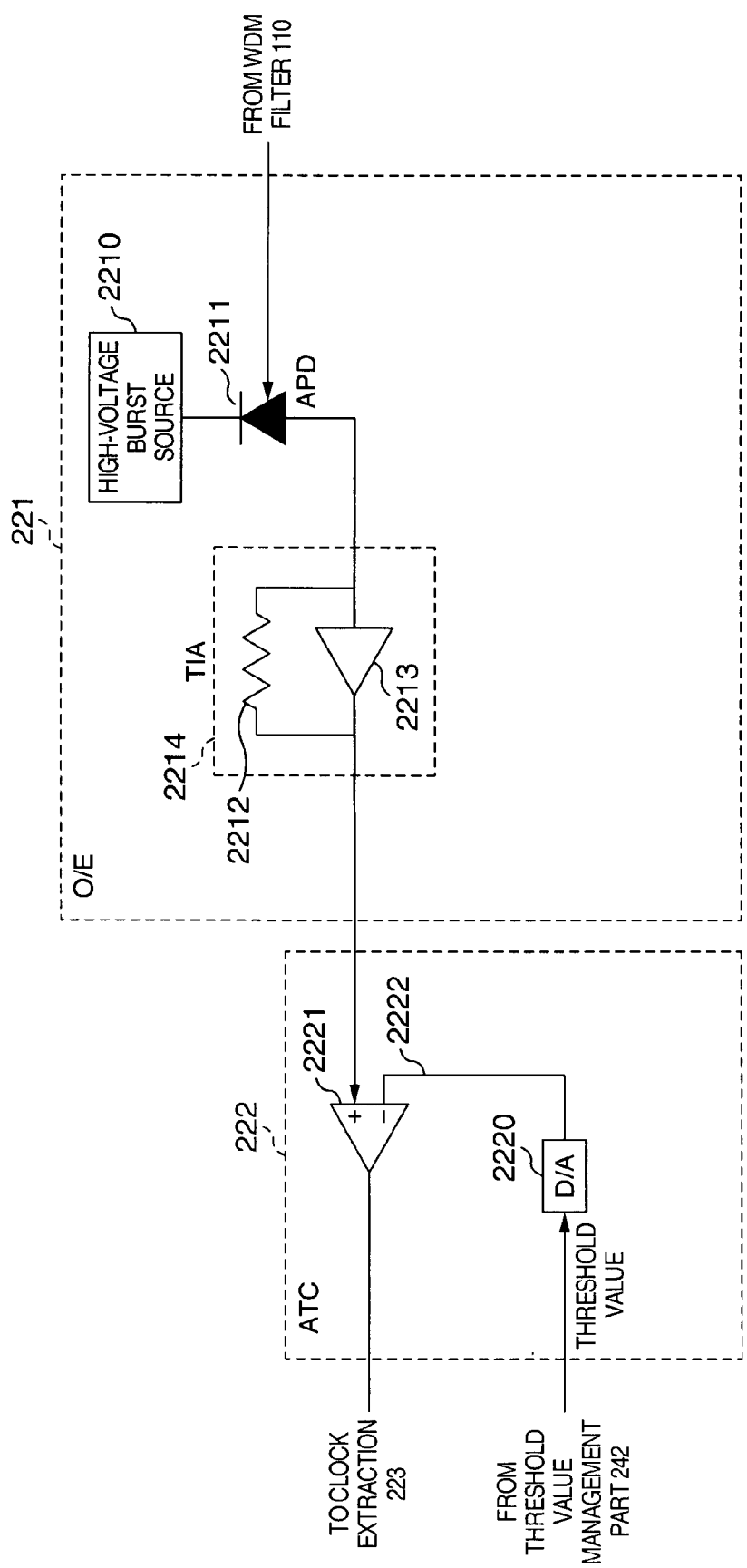
FIG. 8 is a block diagram showing a configuration example of a receiver circuit provided in an OLT.

FIG. 8 is a block diagram showing a configuration example of OLT receiver circuit 220 which is a configuration example of O/E part 221 and ATC 222.

O/E part 221 is a part that amplifies a received optical signal, reverse biased with high voltage by an APD (Avalanche Photo Diode) 2211, connected to high-voltage bias source 2210, by means of the avalanche effect and converts it to electrical current. By means of this amplification effect, it becomes possible to correctly discriminate data even in the case a high-speed signal with a bit rate exceeding 1 Gbit/s is input as a weak optical signal on the order of −30 dBm. The converted current is converted into voltage with a TIA (Trans-Impedance Amplifier) 2214 consisting of a resistance 2212 and an amplifier 2213. The threshold value supplied from threshold value management part 242 is converted with a D/A converter 2220 into an analog voltage 2222 and is supplied to an amplifier 2221 and the voltage from TIA 2214 is compared to this analog voltage 2222, with a signal discriminated as "0" or "1" being output. In this way, if a configuration is chosen in which the threshold value is supplied to amplifier 2221 and the received signal is discriminated, it is possible to provide ATC 222 even without adding a high-speed (costly) device for implementing a level measurement circuit et cetera, such as previously described. That is to say that it has become possible to receive high-speed burst optical signals with an economical configuration.

Figure 9:
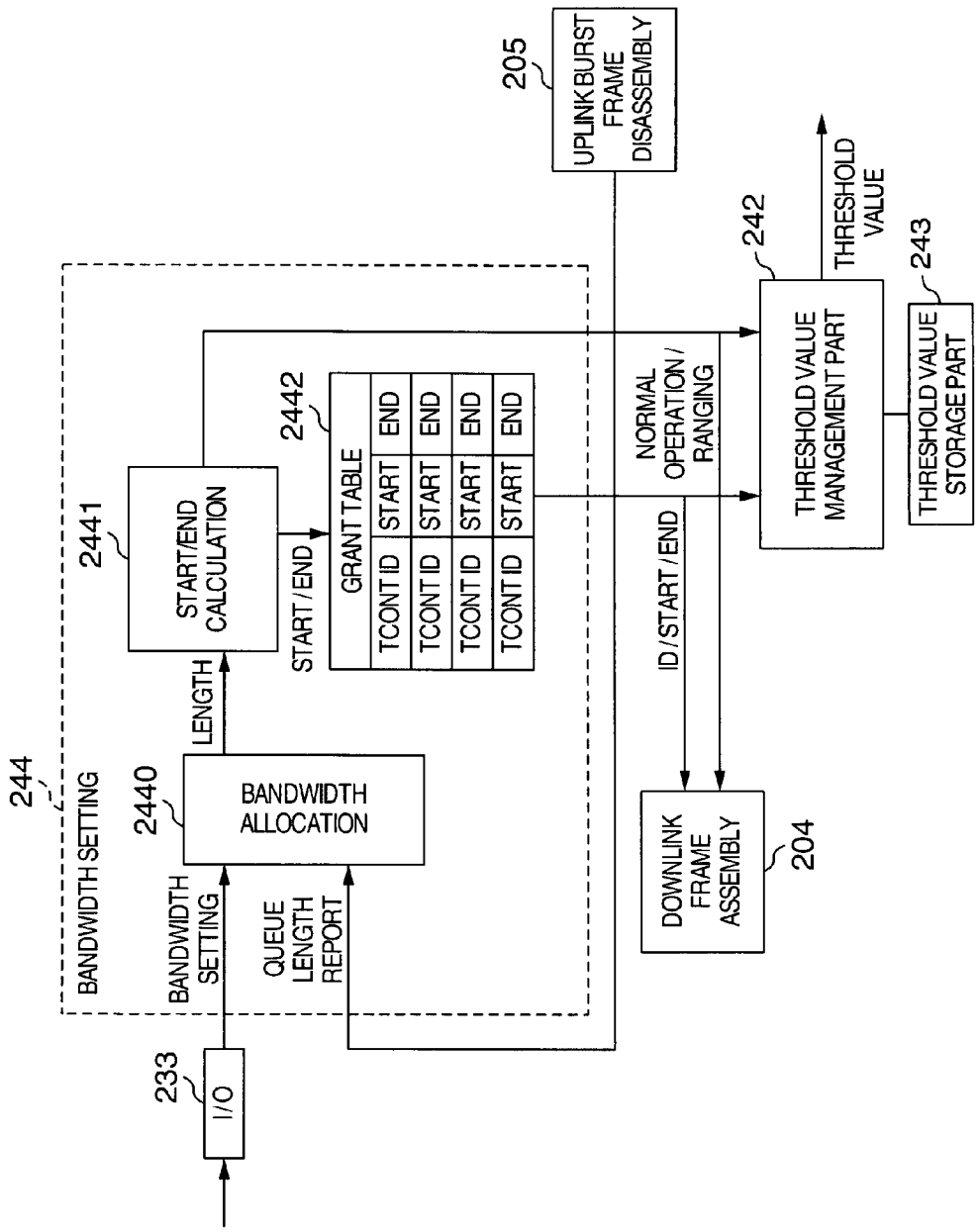
FIG. 9 is a block diagram showing a configuration example of a bandwidth setting part provided in an OLT.

FIG. 9 is a block diagram showing a configuration example of bandwidth setting part 244 of the OLT.

In OLT 200, traffic conditions (minimum guaranteed bandwidth, maximum tolerated bandwidth, degree of priority, and the like) determined by contract with a subscriber that each ONU 300 is equipping are set in advance in control part 230 through an I/O unit 233 from an external maintenance device (not illustrated). Specifically, inside bandwidth setting part 244, they are set in a bandwidth assignment part 2440 carrying out DBA management of bandwidth assignment and the like to each ONU. Further, a configuration may be chosen in which the settings of these traffic conditions are entered in the signals from each ONU 300 and are set using control signals separated by means of uplink burst frame disassembly part 205. Moreover, since, from each ONU 300, a queue length report reporting the quantity of signals waiting for transmission with bandwidth assignment units called TCONT is reported by means of a queue length report domain (Ref. 1204 in FIG. 3), this queue length report is input to bandwidth assignment part 2440 via uplink burst frame disassembly part 205. In bandwidth assignment part 2440, the domain assigned to each ONU 300 (the size of the frame payload granted for transmission: Length) is calculated using the quantity of signals waiting for transmission and traffic conditions, for each of these ONUs (or the TCONT therein), following a DBA algorithm such as that indicated in JP-A-2001-292148. Further, since the DBA algorithm can change depending on the PON request conditions, it is not one that is limited to the aforementioned algorithm. A Start/End calculation part 2441 decides, after taking into account the lengths of the guard time and burst data overhead 2100, based on the calculated Length for each ONU (or TCONT), on a transmission start timing Start and a transmission end timing End of each burst data item 2000 in byte units so that uplink signals 150 from each ONU 300 do not collide or interfere on trunk optical fiber 110 and stores them in grant table 2442 together with the identifier TCONT ID of the concerned burst data. Further, at the time of a system launch or the installation of a new ONU 300, a configuration is chosen in which ranging such as previously described is carried out and the transmission timing setting of burst data according to the aforementioned DBA is terminated, but the signal showing this is also generated by Start/End Calculation part 2441.

The values of the aforementioned TCONT ID, Start element, and End element and the presence of ranging are transmitted to downlink frame assembly part 204 and reported to each ONU 300 using the control signals of grant indication domain 1903 and the like, of downlink signal 130. In each ONU 300, uplink signal 150 including burst data 2000 is transmitted toward OLT 200 with the indicated timing, on the basis of the received control signals. Also, the values of the aforementioned TCONT ID, Start element, and End element and the presence of ranging are also transmitted to threshold value management part 242 and are used for the setting of threshold values for ATC 222 of the present invention, which will be subsequently described.

Figure 10:
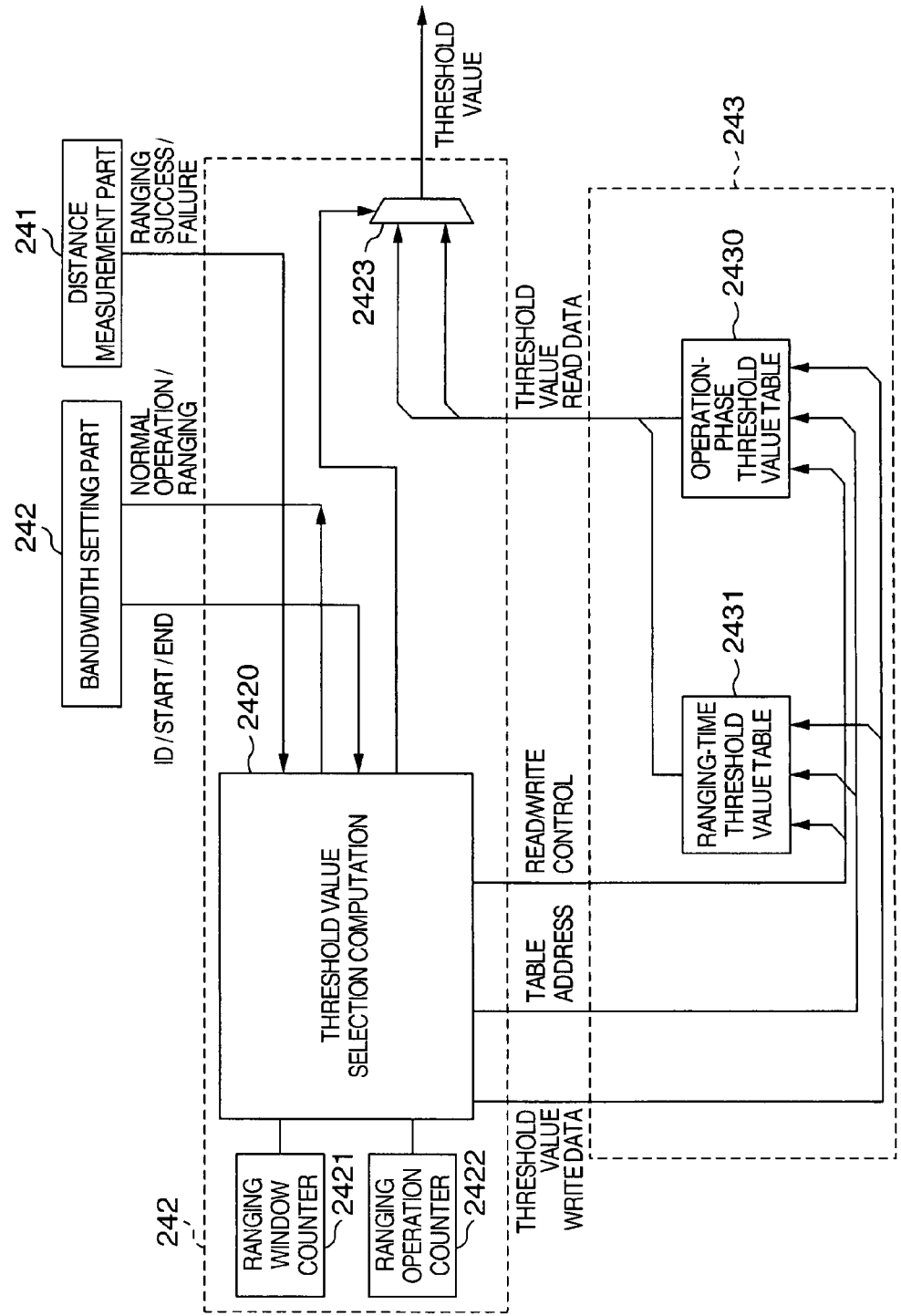
FIG. 10 is a block diagram showing a configuration example of a threshold value management part and a threshold value storage part provided in an OLT.

FIG. 10 is a block diagram showing a configuration example of threshold value management part 242 and threshold value storage part 243 of the OLT.

Threshold value management part 242 consists of a ranging window counter 2421 computing the time (number of bytes) during the implementation of the ranging; a ranging operation counter 2422 computing the number of ranging operations executed with respect to a certain ONU 300; a threshold value selection computation part 2420 selecting appropriate threshold values from the plurality of threshold values set in threshold value storage part 243 using control signals from distance measurement part 241 and bandwidth setting part 244 and the values of said two aforementioned counters 2421 and 2422, and a selector 2423 outputting to ATC 222 the threshold values selected from threshold value storage part 243 with an indication of the concerned computation part 2430. Also, for threshold value storage part 243, a configuration was chosen in which it is provided with a ranging-time threshold value table 2430 in which there are stored a plurality of threshold value candidates used on the occasion of ranging and an operation-phase threshold value table 2431 storing discrimination threshold values of received signals selected from among a plurality of threshold value candidates corresponding to each ONU 300 on the occasion of ranging. In ranging-time threshold value table 2430, a plurality of threshold value candidates determined to correspond to a PON 20 such as shown in FIG. 7 are set in advance from a maintenance terminal (not illustrated) via an I/O part 233 of monitoring control part 230, and operation-phase threshold value table 2431 is a table in which threshold value management part 242, on the occasion of conducting the ranging, sets, for each ONU, threshold values with which uplink signals 150 are correctly received, from among a plurality of threshold value candidates. Further, in the present embodiment, a configuration has been adopted in which there are provided two types of tables storing the threshold values, but the invention is one where the threshold values set in receiver circuit 220 during operation may be stored in some kind of storage means and it is not limited to the configuration of the present embodiment.

Figure 11:
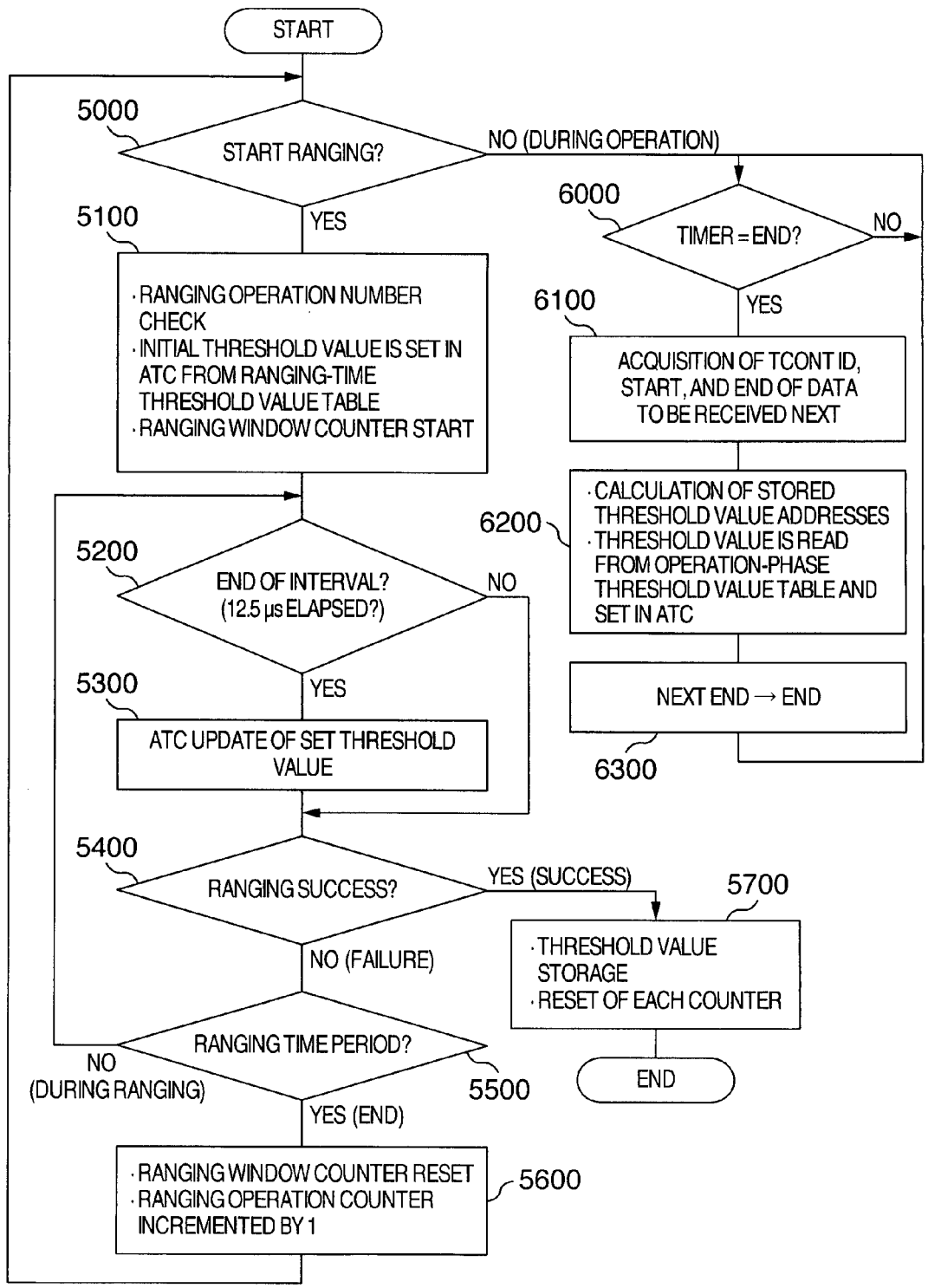
FIG. 11 is a work flow diagram showing a working example of a threshold value selection computation part provided in a threshold value management part.
Figure 13:
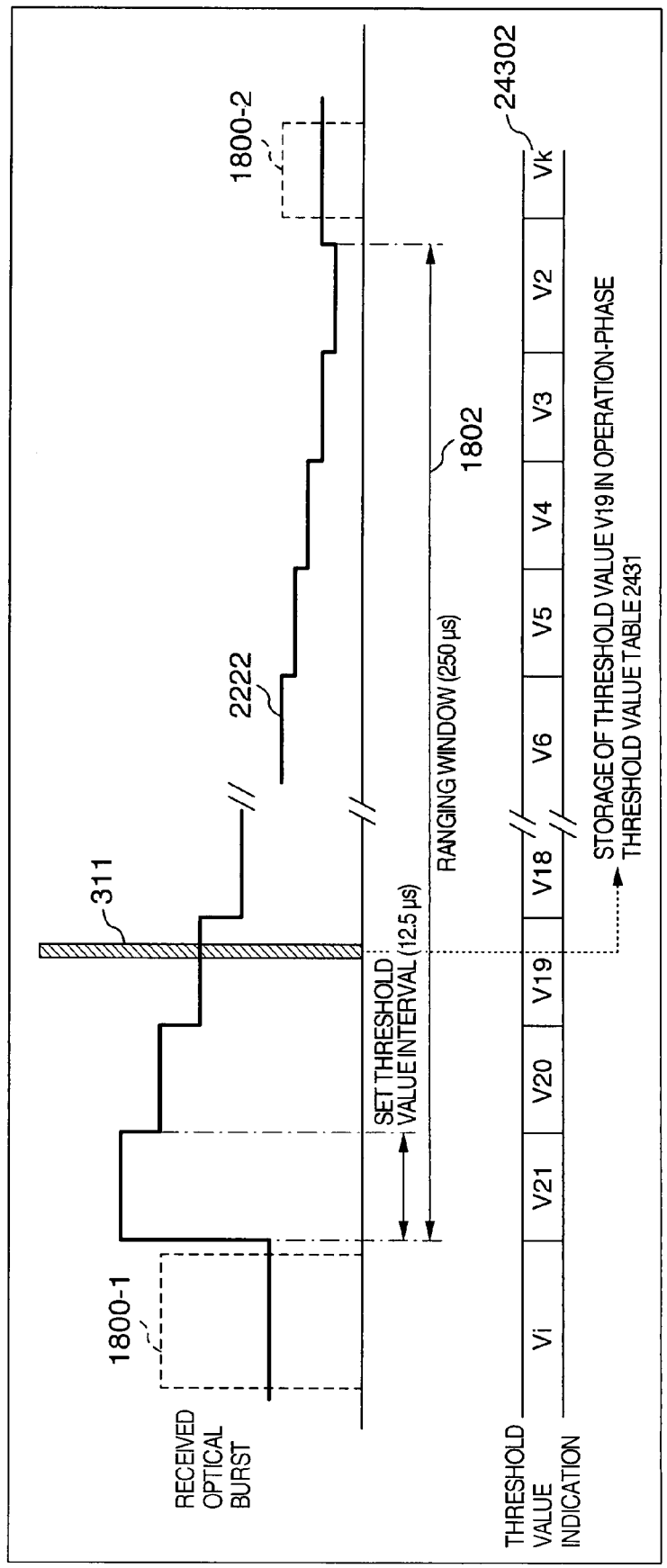
FIG. 13 is an explanatory diagram showing a second working example of a PON.

FIG. 11 is a work flow diagram showing a working example of threshold value selection computation part 2420 and FIG. 12 is a memory block diagram showing a configuration example (a threshold value candidate setting example) of threshold value table during ranging 2430. Also, FIG. 13 is an explanatory diagram of the operation of a PON 20 showing threshold values set in ATC 222 during ranging and a ranging working example. Hereinafter, there will be explained the operation of how OLT 200 of the present invention gradually selects, utilizing the ranging, threshold values appropriate for signal discrimination of optical signals received from each ONU 300.

The ranging itself is e.g. defined in Recommendation G984.3 and, as previously explained using FIG. 4, is a process which is executed at the time of starting PON 20 operation or in the case of the addition of a new ONU 300 and is conducted by OLT's 200 correctly receiving a Ranging Response signal 311 from each ONU 300. The ranging with respect to a certain ONU 300 is a process in which, after stopping signal receiver from each ONU 300, Ranging Response signal 311 from the concerned ONU is searched for (received) during a prescribed interval. Further, in the present embodiment, this prescribed interval has been taken to be 250 μs, taking into account the delay time during which receiver is possible at OLT 200 even if an ONU 300 separated by at most 20 km from OLT 200 transmits a Ranging Response signal 311. Of course, this depends on the configuration of the PON and the invention is not limited to this value. Also, ranging is a process that is repeatedly executed in a prescribed interval until it succeeds, so in the present embodiment, a configuration was chosen in which ranging with respect to a certain ONU is repeated until it succeeds in 1 ms. This value is also a value which can change due to the configuration of the PON or the operating method, so the invention is not limited to the value of the present embodiment.

Generally, the shorter the distance between OLT 200 and ONU 300 is, the smaller the transmission delay is, and moreover, the optical signal from ONU 300 is also received at a higher level at OLT 200 without suffering attenuation. That is to say that the result is that, when ranging is conducted, the Ranging Response signal 311 from an ONU 300 located close to OLT 200 is received with a big (high) signal level in a short time and the Ranging Response signal 311 from an ONU 300 located far away is received with a small (low) signal level in a long time. OLT 200 of the present invention is a device that, utilizing this property, divides one ranging time period into a plurality of intervals to set a large threshold value in ATC 222 so as to receive Ranging Response signal 311 directly after the ranging start and which, for each subsequent time that elapses, switches the threshold value set in ATC 222 in a certain interval to a smaller value so as to receive Ranging Response signal 311. And then, the ranging is repeated until ranging succeeds and the threshold value set in ATC 222 at the moment ranging succeeds (Ranging Response signal 311 is correctly received) is stored and when receiving uplink signal 150 from the concerned ONU 300 during subsequent operation, this stored threshold value is set in ATC 222.

Specifically, the process is one devised to divide the 250 μs ranging interval into twenty 12.5 μs intervals, to set a threshold value prepared in advance in ATC 222 for each interval, and to receive a Ranging Response 311 from ONU 300, with the ranging-time threshold value table 2430 being configured, as shown in the memory block diagram of FIG. 12, by using the threshold value candidates explained in FIG. 7. That is to say that a configuration in which threshold value 24302 set in ATC 222 is stored for each interval 24301 corresponding to a number of ranging operations 24300. In the same drawing, a configuration was chosen in which, in case the ranging operation number is 1 to 3, the maximum threshold value V21 is set for the first 0-12.5 μs interval (corresponding to a distance to ONU 300 of 0 to 1 km) at the time of the ranging start, threshold value V20 is set in the 12.5-25 μs interval (corresponding to a distance to ONU 300 of 1 to 2 km), and thereafter, for each lapse of 12.5 μs (corresponding to an extension in the distance to ONU 300 of 1 km), the value of the threshold value is set lower. Further, the fact of taking the ranging operation number to be 1 to 3 was for the reason of normally carrying out ranging a multiple number of times (three in the present embodiment) since there exists random error in the uplink transmission path.

1. Stated in greater detail, since it is possible to obtain an indication from bandwidth setting part 244 as to whether there is execution of ranging or normal operation, threshold value selection computation part 2420 first checks, at the time of the start of the ranging (Ref. 5000 in FIG. 11), the ranging operation number by means of ranging operation counter 2422 and indicates the address reading out the initial setting threshold value from ranging-time threshold value table 2430 for the concerned ranging operation number and reads out the threshold value in addition to setting the threshold value read out to ATC 222 via selector 2423, and starts ranging window counter 2421 measuring the time during which ranging is conducted (Ref. 5100 in FIG. 11).

2. Threshold Value Selection Computation Part 2420 indicates, for each time that ranging window counter 2421 measures a prescribed time (the 12.5 μs interval), the address reading out the threshold value to be set next, reads out a new threshold value and resets it in ATC 222 (Refs. 5200 and 5300 in FIG. 11). In this process, if receiver circuit 220 correctly receives a Ranging Response signal 311, since distance measurement part 241 reports ranging success (Ref. 5400 in FIG. 11), each table, 2430 and 2431, of threshold value storage part 243, is controlled so that the threshold value installed in ATC 222 at that time is read into operation-phase table 2431 and each counter, 2421 and 2422, is reset (Ref. 5700 in FIG. 10 and FIG. 11).

FIG. 13 shows the situation in which a threshold value 2222 set in ATC 222 is updated for each 12.5 μs interval during the ranging interval 1802 with respect to a certain ONU 300. Here, if Ranging Response signal 311 from the concerned ONU 300 can, as illustrated, be received in the interval in which threshold value V19 is set, this V19 value is stored, together with the identifier of the concerned ONU, in operation-phase threshold value table 2431. Of course, at this point in time, the ranging comes to an end and the illustrated operations after V19 are omitted, but in case the threshold value set in ATC 222 and the receiver timing of Ranging Response signal 311 do not match well, the process proceeds to the sequence below, since ranging has not succeeded.

3. Threshold selection computation part 2420 conducts an update (Ref. 5500 in FIG. 11) of the threshold value in each interval in the ranging time period and in case ranging success is not received during this time, it temporarily resets ranging window counter 2421, increments ranging operation counter 2422 by 1 and provides it for the subsequent ranging start (Ref. 5600 in FIG. 11).

4. Threshold selection computation part 2420, if e.g. a threshold value cannot be selected because the first to third ranging operations has not succeeded, the subsequent ranging is attempted using the fourth to sixth threshold values (the values stored below the first to third threshold values) in ranging-time threshold value table 2430 at the time of the subsequent ranging.

In this way, taking the case of at most 63 ranging operations, it is possible, in the present embodiment, for the receiver circuit threshold value with which it is possible to correctly receive an uplink signal 150 from the concerned ONU 300 to be selected from among a plurality of threshold value candidates and set during operation, when the ranging for a certain ONU 300 has been completed. Further, even if the period of conducting the ranging is taken to be 1 ms, since the selection of the threshold values is completed at worst in 63 ms, it never occurs that the launch of ONU 300 is held up for a long time. Further, the length of the ranging time, the number of time divided intervals, the threshold values set in the intervals, and the period with which the ranging is conducted and the number of times it is conducted, explained in the present embodiment, are, as also described in the explanation of FIG. 7, quantities for which it does not matter if they are appropriately updated depending on the configuration and demanded performance of PON 20, and are not limited to these values.

If a configuration is chosen in which threshold values are supplied to ATC 222 and received signals are discriminated by means of the aforementioned configuration and operation, it has become possible to economically receive high-speed burst optical signals, since an ATC 222 can be provided without adding high-speed (costly) devices for implementing measurement circuits and the like.

Figure 15:
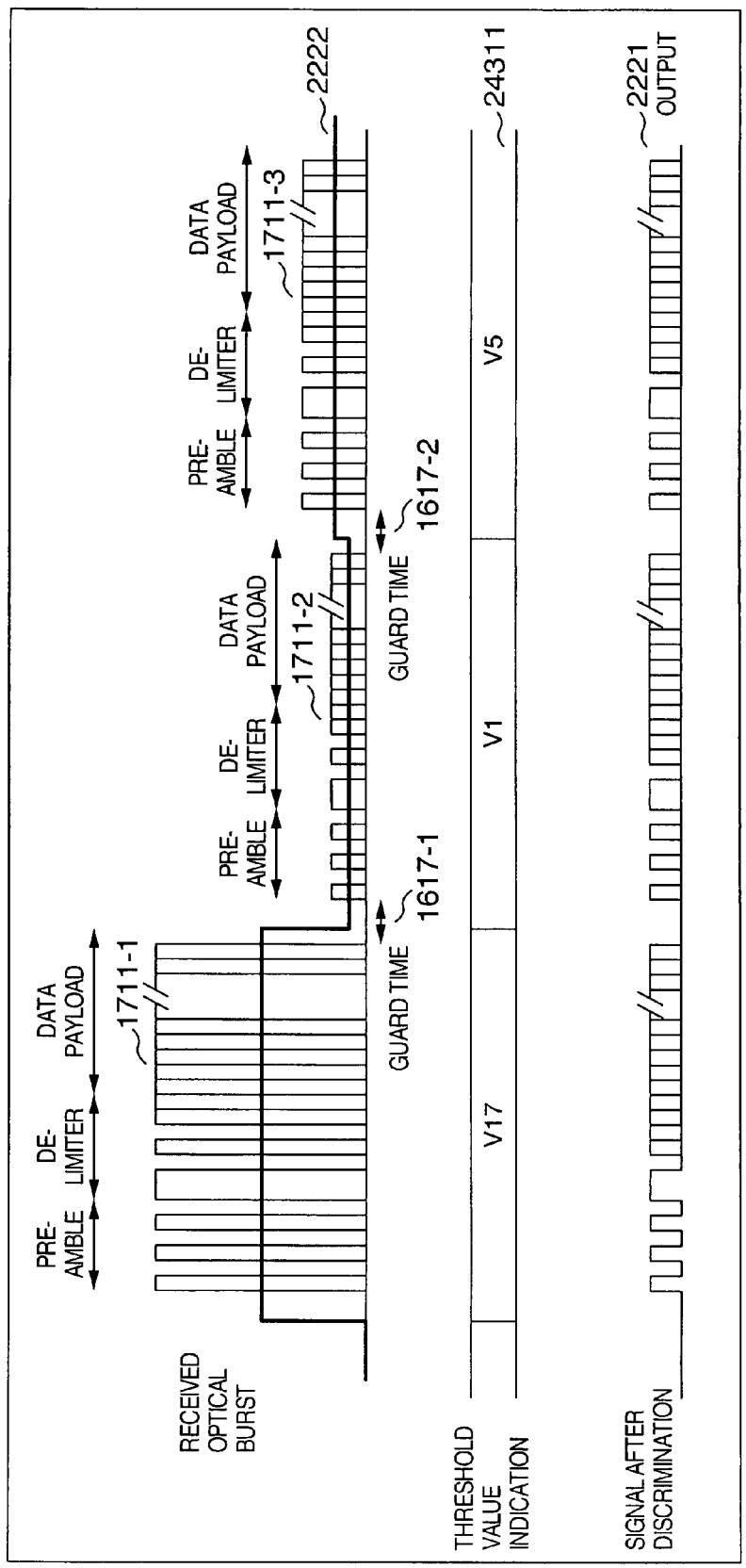
FIG. 15 is an explanatory diagram showing a third working example of a PON.

FIG. 14 is a memory block diagram showing a configuration example (a setting example of threshold values selected for each ONU 300 from among threshold value candidates) of threshold value table 2431 during operation, set when ranging is conducted. Also, FIG. 15 is an operation explanatory diagram of OLT 200, showing an example indicating the relationship between uplink signal 150, received from ONU 300 during operation, and threshold values set in ATC 222. Hereinafter, there will be explained the operation in which OLT 200 sets an appropriate threshold value on the occasion of receiving uplink signal 150 from each ONU 300 and receives the signal.

Operation-phase threshold value table 2431 is a table storing ONU 300 identifiers (ONU IDs 24310) and threshold values 24311 selected from among a plurality of threshold value candidates on the occasion of the aforementioned ranging, and in the same drawing, there are shown the threshold values set in receiver circuit 220, in case uplink signals 150 are received from ONU No. 1 to ONU No. 3. During operation of the PON, bandwidth setting part 244 of OLT 200 decides, as previously explained, on the quantity of signals for which transmission is granted by means of DBA and, for each ONU 300 or TCONT, reports the timing for which transmission is granted to each ONU 300, and each ONU 300 transmits an uplink signal 150 on the basis of this report. When multiplexed optical signal 140, in which these uplink signals are time division multiplexed on trunk fiber 110, is received in OLT 200, for receiver of the concerned ONU, a threshold value appropriate for receiver of the concerned ONU is set in ATC 222 before receiver of the uplink signal and receiver is carried out after recognizing from which ONU 300 uplink signal 150 is transmitted.

Specifically, since bandwidth setting part 244 indicates with DBA the burst data Start and End of the signal transmission timing at each ONU 300, if this occurs during operation when the delay quantity of each ONU is adjusted, control part 230 of OLT 200 knows the signal from which ONU 300 can be received (or is received) with which timing. That is to say that:

1. If threshold value selection computation part 2420 recognizes (Ref. 5000 in FIG. 11) that there is currently operation by means of an indication from bandwidth setting part 344 as to whether there is execution of ranging or normal operation, it brings into operation a not illustrated timer (counter), computes the hour and byte position inside the frame of the signal received at the present time checks (Ref. 6000 in FIG. 11) whether the uplink signal 150 indicated by a certain ONU 300 (e.g. ONU No. 1, 300-1) has reached End timing at which transmission comes to an end.

2. Threshold Value Selection Computation Part 2420, if what is concerned is End timing, introduces the values, from bandwidth setting part 244, of TCONT ID, Start, and End indicated to uplink signal 150 to be subsequently received; indicates, after having identified from which ONU the uplink signal is, the address reading out the threshold value to be set next (e.g. threshold value V5 corresponding to ONU No. 2, 300-2); reads out a new threshold value from operation-phase threshold value table 2431, and sets it anew in ATC 222 (Ref. 6200 in FIG. 11) through selector 2423. When this setting comes to an end, it returns to the sequence in Part 1, using the introduced End value (Ref. 6300 in FIG. 11).

FIG. 15 shows a situation in which uplink signals 150 are assigned by DBA in the order of ONU No. 1 (300-1), ONU No. 2 (300-2), and ONU No. 3 (300-3), and multiplexed optical signal 140 is progressively received by updating the threshold value in ATC 222. When the receiver of uplink signal 150 from ONU No. 1 (300-1) comes to an end, threshold value 2222 set in ATC 222 changes, during guard time 1617-1 elapsing until uplink signal 150 from ONU No. 2 (300-2) coming next is received, from V17 to V1, making it possible to receive uplink signal 150 from ONU No. 2. If signal receiver from ONU No. 2 (300-2) comes to an end, threshold value 2222 set in ATC 222 is similarly changed from V1 to V5 during guard time 1617-2, and it is possible to receive uplink signal 150 from ONU No. 3 (300-3) coming next.

If a configuration is chosen in which threshold values are supplied to ATC 222 and received signals are identified by means of the aforementioned configuration and operation and since, as shown in FIG. 15, a new threshold value can be installed during the guard time, there is no need, as was conventionally the case, to set a maximum of 12 bytes, defined in Recommendation G984.3, for the burst overhead consisting of preambles and delimiters, so it is possible to enable the receiver of uplink signals if there are guard times and delimiters. That is to say that since the bandwidth assigned to each ONU with DBA can be increased by just the portion corresponding to these reduced bytes, it becomes possible to strive for efficient bandwidth use. For example, if there is the case of assigning bandwidth for an uplink signal defined in Recommendation G984.3 at a speed of 1.24416 Gbit/s with respect to at most 62 ONUs, if the guard time and the preamble can temporarily be shortened all the way to 2 bytes, it becomes possible to assign, within 155520 bits/frame, signals of 10 bytes×(8 bits/byte)×62/frame to the payload, making it possible to efficiently use a further 1% of the bandwidth.

Further, during operation, due to the main causes of variation such as environmental changes like temperature changes and variations due to aging of product characteristics, it sometimes occurs that uplink signals are shifted from the timing for which an uplink signal from ONU is indicated, since the actual transmission distances between the OLT and the ONUs vary. For this reason, variations in the timing of received signals during operation are monitored in the ranging process, and in case the variation matches the timing, the delay quantity set in the ONU is corrected. In this case, since the received signal level also varies in response to the variation in the actual transmission distance, when there occurs a delay correction equal to or greater than the prescribed value, the aforementioned threshold value candidate selection is repeated and an operation of resetting an appropriate threshold value during operation may be added.

In the explanation of the aforementioned embodiment, the explanation was given citing the example of a GPON compliant with ITU-T Recommendation G984.3, but it goes without saying that other PONs, e.g. a BPON compliant with the same ITU-T Recommendation G983.1, an Ethernet™ PON defined in Ch. 64 of the IEEE 802.3 Standard, or even a PON handling high-speed signals at 10 Gbit/s or more, which is likely to be developed and introduced, can be applicable.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A Passive Optical Network system for connecting a parent station and each of a plurality of subsidiary stations by means of an optical fiber network including an optical splitter, wherein said parent station is provided with:
    (1) a receiver circuit receiving optical signals from each of said plurality of subsidiary stations by using threshold values discriminating 0's and 1's; and
    (2) and a control part including:
        (2)-1: a distance measurement part for ranging distance between each of the plurality of subsidiary stations and the parent station,
        (2)-2: a bandwidth setting part for deciding on the timing with which each of said plurality of subsidiary stations transmits optical signals and reporting the same to each of said subsidiary stations; and
        (2)-3: a threshold value management part for providing a plurality of optical signal threshold value candidates and selecting and storing, from among said plurality of threshold value candidates, threshold values with respect to each of the subsidiary stations with which optical signals are received from each of said plurality of subsidiary stations, the threshold value management part including;
            (2)-3A: a first memory for storing a set of threshold candidates for each of the plurality of optical signals,
            (2)-3B: a second memory for storing threshold value for each of the plurality of optical signals respectively corresponding to each of the plurality of subsidiary stations selected from among a plurality of threshold value candidates,
            (2)-3C: a first counter for computing a number of ranging operations,
            (2)-3D: a second counter for controlling time of periods having been divided into plurality of portions in which a ranging operation is to be performed,
            (2)-3E: a selector for selecting output from either one of the first or the second memory and, for setting the selected output at the receiver circuit, and
            (2)-3F: a threshold value selection computation part for selecting and storing threshold value together with both the distance measurement part and the bandwidth setting part, and further outputting the threshold value to the receiver circuit,
    wherein said control part, when a ranging operation is to be performed for an arbitrary subsidiary station, controls:
        (1) the distance measurement part so as to measure distance with changing each of threshold candidates having been read out from the first memory in accordance with output of the first counter and the second counter, and
        (2) the first memory and the second memory so as to store a threshold candidate having been stored in the first memory which has been used during a ranging operation to the second memory as a threshold value for the arbitrary subsidiary station in response to a signal indicating a successfully performed ranging operation, and
    wherein, when the bandwidth setting part transmits a transmission timing signal to the arbitrary subsidiary station, the threshold for the arbitrary subsidiary station having been stored in the second memory is set at the receiver circuit through the selector in response to a termination of transmission of an optical signal for another subsidiary station before the timing signal.

* * * * *

UNITED STATES PATENT AND TRADEMARK OFFICE
CERTIFICATE OF CORRECTION

PATENT NO. : 7,680,414 B2
APPLICATION NO. : 11/806130
DATED : March 16, 2010
INVENTOR(S) : Tohru Kazawa et al.

It is certified that error appears in the above-identified patent and that said Letters Patent is hereby corrected as shown below:

On the title page of the patent, Item "(73) Assignee", please change "Hitachi Communication Technologies, Ltd." to --Hitachi, Ltd.--.

Signed and Sealed this
Eighteenth Day of January, 2011

David J. Kappos
*Director of the United States Patent and Trademark Office*